United States Patent
Derbyshire (10) Patent No.: US 11,801,627 B2
(45) Date of Patent: Oct. 31, 2023

(54) METHODS FOR FORMING EXTRUDED SHAPES WITH HYDRODYNAMIC FOCUSING APPARATUS AND OPTIONALLY SMART CORE FLUIDS

(71) Applicant: HUMMINGBIRD NANO, INC., Nicholasville, KY (US)

(72) Inventor: Eleanor Augusta Derbyshire, Lexington, KY (US)

(73) Assignee: Hummingbird Nano, Inc., Lexington, KY (US)

( * ) Notice: Subject to any disclaimer, the term of this patent is extended or adjusted under 35 U.S.C. 154(b) by 0 days.

(21) Appl. No.: 17/380,327

(22) Filed: Jul. 20, 2021

(65) Prior Publication Data
US 2022/0016819 A1   Jan. 20, 2022

Related U.S. Application Data

(60) Provisional application No. 63/053,773, filed on Jul. 20, 2020.

(51) Int. Cl.
| | |
|---|---|
| B29C 48/345 | (2019.01) |
| B29C 35/08 | (2006.01) |
| B29C 48/32 | (2019.01) |
| B29C 48/92 | (2019.01) |
| B29C 48/05 | (2019.01) |
| B29C 48/25 | (2019.01) |

(52) U.S. Cl.
CPC ........ *B29C 48/345* (2019.02); *B29C 35/0805* (2013.01); *B29C 48/05* (2019.02); *B29C 48/32* (2019.02); *B29C 48/92* (2019.02); *B29C 48/266* (2019.02); *B29C 2035/0827* (2013.01); *B29C 2948/92571* (2019.02); *B29C 2948/92904* (2019.02)

(58) Field of Classification Search
None
See application file for complete search history.

(56) References Cited

U.S. PATENT DOCUMENTS

2010/0247742 A1* 9/2010 Shi .......................... B33Y 30/00
                                                                118/712
2014/0035975 A1* 2/2014 Essien ..................... B41J 2/211
                                                                347/6

* cited by examiner

*Primary Examiner* — Francisco W Tschen
*Assistant Examiner* — Guy F Mongelli
(74) *Attorney, Agent, or Firm* — Carrithers Law Office, PLLC (57) ABSTRACT

A method and apparatus for forming extruded shapes having at least a hollow portion using a hydrodynamic nozzle, a curable fluid, and a core fluid.

16 Claims, 9 Drawing Sheets

Figure 1

Figure 2
Section View

Figure 3
End View, Enlarged

METHODS FOR FORMING EXTRUDED SHAPES WITH HYDRODYNAMIC FOCUSING APPARATUS AND OPTIONALLY SMART CORE FLUIDS

CROSS-REFERENCE TO RELATED APPLICATIONS

The present application claims priority to U.S. Provisional Patent Application 63/053,773, filed Jul. 20, 2020, all of which is hereby incorporated by reference herein in its entirety.

STATEMENT REGARDING FEDERALLY SPONSORED RESEARCH

None.

BACKGROUND

1. Field of the Disclosure

The present disclosure relates to three-dimensional fabrication using hydrodynamic focusing.

2. Description of the Related Art

Hydrodynamic focusing is a scientific concept for creating a flow of an outer "sheath" fluid surrounding a core fluid within a closed tube or channel. Hydrodynamic focusing is described by Navier-Stokes equations for 3-dimensional flow, and various trends and approximations (described below) have been developed to describe the behavior of the fluids. Both the sheath and the core fluid are laminar in flow, and Reynolds numbers between 1-10 are generally preferred to create continuous core flow (Spatiotemporal instability of a confined capillary jet, Herrada M A, Gañán-Calvo A M, Guillot P. Phys. Rev. E. 2008; 78:046312). The diameter of the inner fluid is determined by the ratio of viscosities, flow rates, geometry of the surrounding channel prior to ejection from the channel, and the continuous phase capillary number (for the sheath flow with respect to the core fluid). For a given set of fluids, the result is that by adjusting the flow rate, one can adjust the cross-sectional diameter of the core fluid and alter the output.

Hydrodynamic focusing is dominated by three elements: 1) The ratio of the core viscosity to the sheath viscosity; 2) continuous phase capillary number for the core flow, and; 3) the geometry of the structure through which both fluids flow. It is theorized that inertia is an important factor with regards to the transition between jetting, which is continuity of the core diameter, and droplet formation (Spatiotemporal instability of a confined capillary jet, Herrada M A, Gañán-Calvo A M, Guillot P. Phys. Rev. E. 2008; 78:046312 and Stability of a Jet in Confined Pressure-Driven Biphasic Flows at Low Reynolds Numbers, Guillot P, Colin A, Utada A S, Ajdari A. Phys. Rev. Lett. 2007; 99:104502).

The viscosity ratio of $\mu_d/\mu_c$ (where $\mu_d$ is the viscosity of the core fluid and $\mu_c$ is the viscosity of the sheath fluid) is useful because as this ratio decreases, the dripping regime increases. There is a transitional regime between droplet formation and jetting (continuous core flow) (Nunes J K, Tsai S S, Wan J, Stone H A. Dripping and jetting in microfluidic multiphase flows applied to particle and fiber synthesis. *J Phys D Appl Phys.* 2013; 46(11):114002. doi: 10.1088/0022-3727/46/11/114002).

The continuous phase capillary number is:

$$Ca_c = \frac{\mu_c U_c}{\gamma}$$

Where $\mu_c$ is the viscosity of the sheath fluid, $U_c$ is the velocity of the sheath fluid, and $\gamma$ is the interfacial energy. There is currently insufficient data to correlate a $Ca_c$ number to the transition between droplet formatting and jetting (Nunes J K, Tsai S S, Wan J, Stone H A. Dripping and jetting in microfluidic multiphase flows applied to particle and fiber synthesis. *J Phys D Appl Phys.* 2013; 46(11):114002. doi: 10.1088/0022-3727/46/11/114002). As the $Ca_c$ number increases, the core flow moves to jetting. The $Ca_c$ can also be increased by lowering the interfacial energy by techniques such as adding surfactants to the fluids, creating partially miscible fluids (Nunes J K, Tsai S S, Wan J, Stone H A. Dripping and jetting in microfluidic multiphase flows applied to particle and fiber synthesis. *J Phys D Appl Phys.* 2013; 46(11):114002. doi:10.1088/0022-3727/46/11/114002).

For flow within a cylinder, the radius of the core fluid can be estimated as:

$$R_d = R\left[1 - \left(\frac{Q_c}{Q_d + Q_c}\right)^{1/2}\right]^{1/2}$$

Where $Q_c$ is the flow rate of the sheath fluid, $Q_d$ is the flow rate of the core fluid, Rd is the radius of the core fluid and R is the channel radius (Jeong W, Kim J, Kim S, Lee S, Mensing G, Beebe D J. Lab Chip. 2004; 4:576-580).

At the experimental level, a filament was created by using a two-component mixture in which the solvent was used as a sheath fluid, and a polymerizable resin for the core fluid. The sheath fluid contained 3% benzoyl peroxide. The polymerizable resin was polyethylene glycol 400 diacrylate. (Book, 3D Printed Microfluidic Devices, edited by Savas Tasoglu, Albert Folch, MDPI AG, Dec. 21, 2018, pg 19). This approach is not at all similar to the present disclosure, but demonstrates the desire to create three-dimensional shapes by using hydrodynamic methods.

What is needed is a method and apparatus for forming extruded shapes having at least a hollow portion using a hydrodynamic nozzle, a curable fluid, and a focusing fluid.

SUMMARY

The present disclosure provides a method and apparatus for forming an extruded shape. The apparatus comprises a hydrodynamic nozzle, a curing system, a material bed, a control system and optionally a pressure system and a fluid drain system. The method comprises simultaneously introducing a curable sheath fluid and a core fluid from the hydrodynamic nozzle to form a concentric extrusion, depositing at least a portion of the concentric extrusion on the material bed, and causing relative motion between the hydrodynamic nozzle and the material bed to form an extruded shape. The method further comprises curing or partially curing part or all of the external curable fluid. The method may optionally may introduce the concentric extrusion to pressure from the pressure system to remove the internal core fluid from the external curable fluid, and may optionally receiving the core fluid into the fluid drain system.

DETAILED DESCRIPTION

It is to be understood that various omissions and substitutions of equivalents are contemplated as circumstances may suggest or render expedient, but these are intended to cover the application or implementation without departing from the spirit or scope of the claims of the present disclosure. It is to be understood that the present disclosure is not limited in its application to microfluidic applications set forth in the following description. The present disclosure is capable of other embodiments and of being used in various applications. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item.

Any extruded shape, even if extruded onto a planar surface, is considered "three-dimensional" since the extrusion has a thickness, and additional process disclosed herein may cause a varying thickness.

The term "core fluid" is interchangeable with "focusing fluid".

Figure 1:
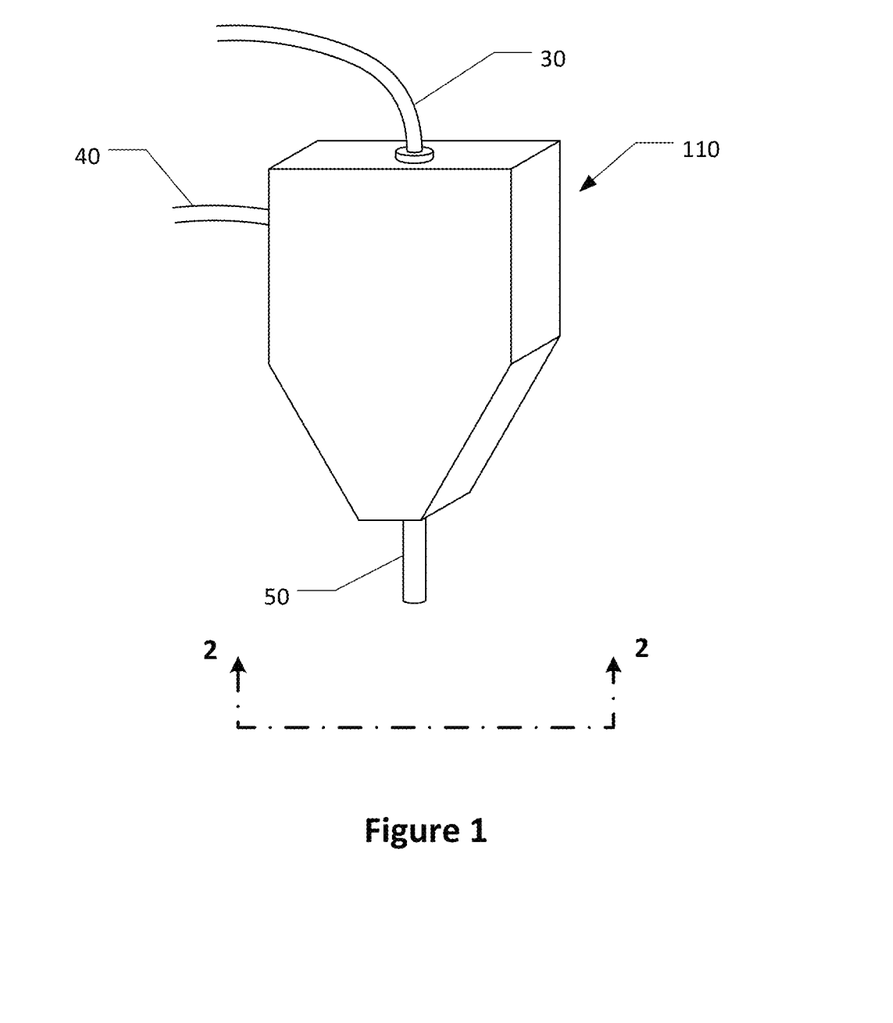
FIG. 1 shows an oblique view of a hydrodynamic nozzle assembly.

FIG. 1 shows an oblique view of a hydrodynamic nozzle assembly 110. There is shown a first conduit 30 and a second conduit 40. There is also shown a concentric extrusion 50 formed by the hydrodynamic nozzle assembly 110.

Figure 2:
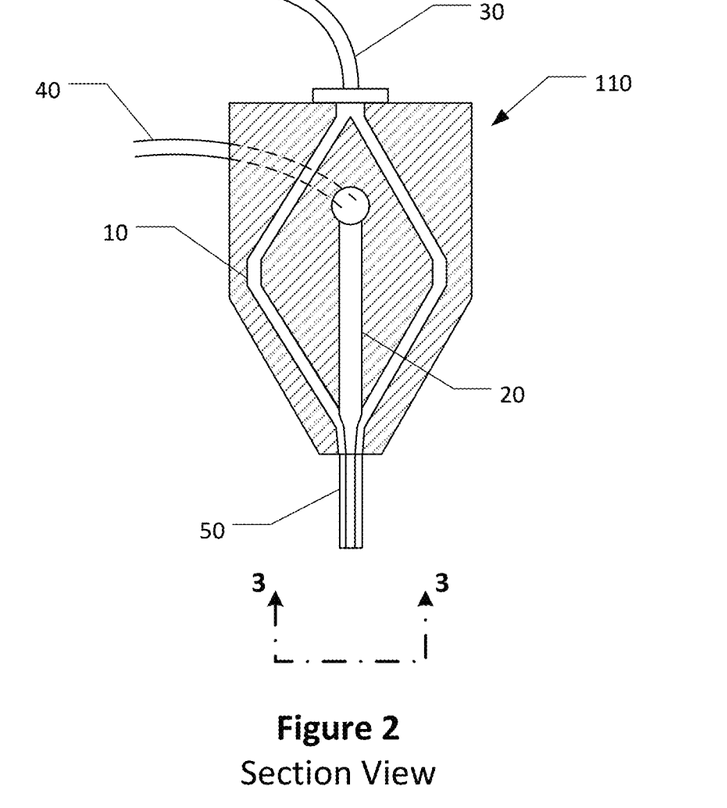
FIG. 2 shows a section view of a hydrodynamic nozzle assembly.

FIG. 2 is a section view of a hydrodynamic nozzle assembly 110. In the figure, a first conduit 30 supplies a sheath fluid to a sheath fluid channel 10. A second conduit 40 supplies a core fluid to the core fluid channel 20. As shown, the sheath fluid channel 10 splits into two channels near a top position, then merges to surround the core fluid channel 20 near a bottom position. This encourages laminar flow for both fluids as the fluids exit the channels.

Figure 3:
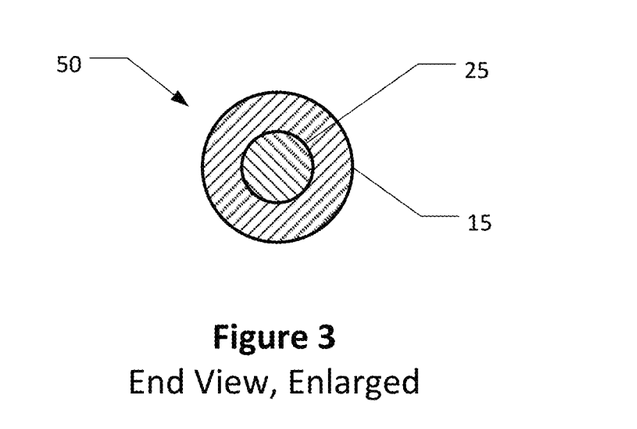
FIG. 3 shows an enlarged end view of a concentric extrusion formed by a hydrodynamic nozzle assembly.

FIG. 3 shows an enlarged end view of a concentric extrusion 50 wherein the sheath fluid 25 surrounds the core fluid 15.

Figure 4:
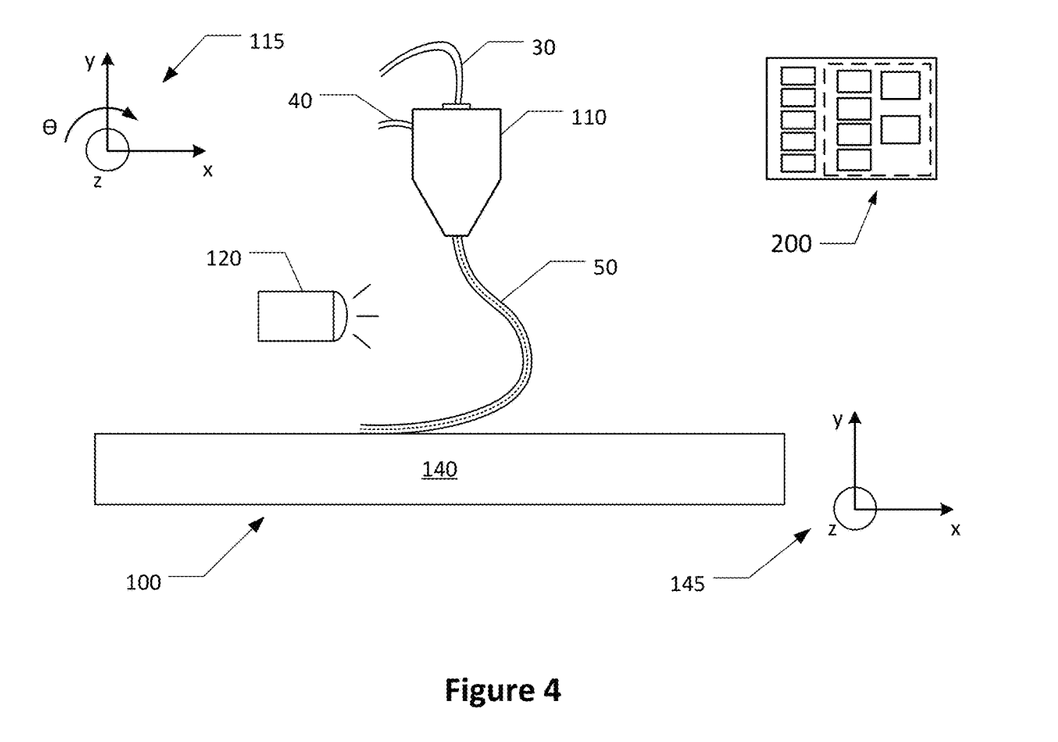
FIG. 4 shows an embodiment of a machine system for forming extruded shapes.

FIG. 4 shows an embodiment of a machine system 100 for forming extruded shapes. There is shown a hydrodynamic nozzle assembly 110 supplied sheath fluid 15 (not shown) from a first conduit 30, and core fluid 25 (not shown) from a second conduit 40. The hydrodynamic nozzle assembly 110 is configured in the machine system 100 to have an independent nozzle axis 115. As shown, there are four degrees of freedom including x-, y-, and z-translation, and θ rotation about the z-axis. Depending on the application, more or less degrees of freedom may be desired.

There is also shows a material bed 140 for receiving the extrusion 50. Extrusion 50 is normally flexible prior to curing. Material bed 140 provides a surface for forming 2-dimensional (2D) and three-dimensional (3D) shapes. A material bed axis 145 provides three-degrees of freedom for forming shapes from extrusion 50. These include x-, y-, and z-translation. Having two separate axes (115 and 145) enables greater flexibility in forming shapes from extrusion 50. We therefore describe motion as "relative motion" since both axes 115 and 145 may contribute. A control system 200 provides control to all electrical systems of the machine system 100, which will be described in detail with reference to FIG. 6.

FIG. 4 also shows a curing system 120. In a preferred embodiment, the curing system 120 is an ultraviolet (UV) system that is capable of rapidly curing a UV-responsive sheath material such as SR399 which is a dipentaerythritol pentaacrylate (DPHPA) available from Arkema S. A. in Colombes, France, or Arkema USA, LLC in Exton, Pa. It is preferred that the UV curing system 120 surrounds the extrusion 50 during curing to provide rapid and uniform curing. One example of a UV surround system is to use reflectors to surround a single UV source. The reflectors may be positioned to redirect UV energy uniformly around the extrusion 50. In another example, a UV ring light, which normally consists of a series of UV LEDs positioned in a doughnut shape, may be used. One example of a UV ring light is a VisiLED UV ring light available from Schott (www.schott.com). A combination of UV lights may provide partial curing near the hydrodynamic nozzle assembly 110 by, for example, a UV ring light, and one or more additional UV lights directed to the final shape that may be positioned on a material bed 140. Material bed 140 may be metal, polymeric, glass, silicon wafer, or any suitable surface. The material bed 140 may include threaded holes for attaching special fixtures which may be used to make specific shapes. One or more portions of material bed 140 may also be transparent or translucent to provide for additional UV lights to minimize any shadow areas, thereby enabling uniform UV curing of extrusion 50.

An extruded shape that is at least partially cured in situ may be created in free space, wherein a shape may be extruded to make contact with the material bed 140 but then be moved away from the material bed 140 (in a y-direction), translated in an x- or z-direction in free space, then again making contact with the material bed 140.

Figure 5:
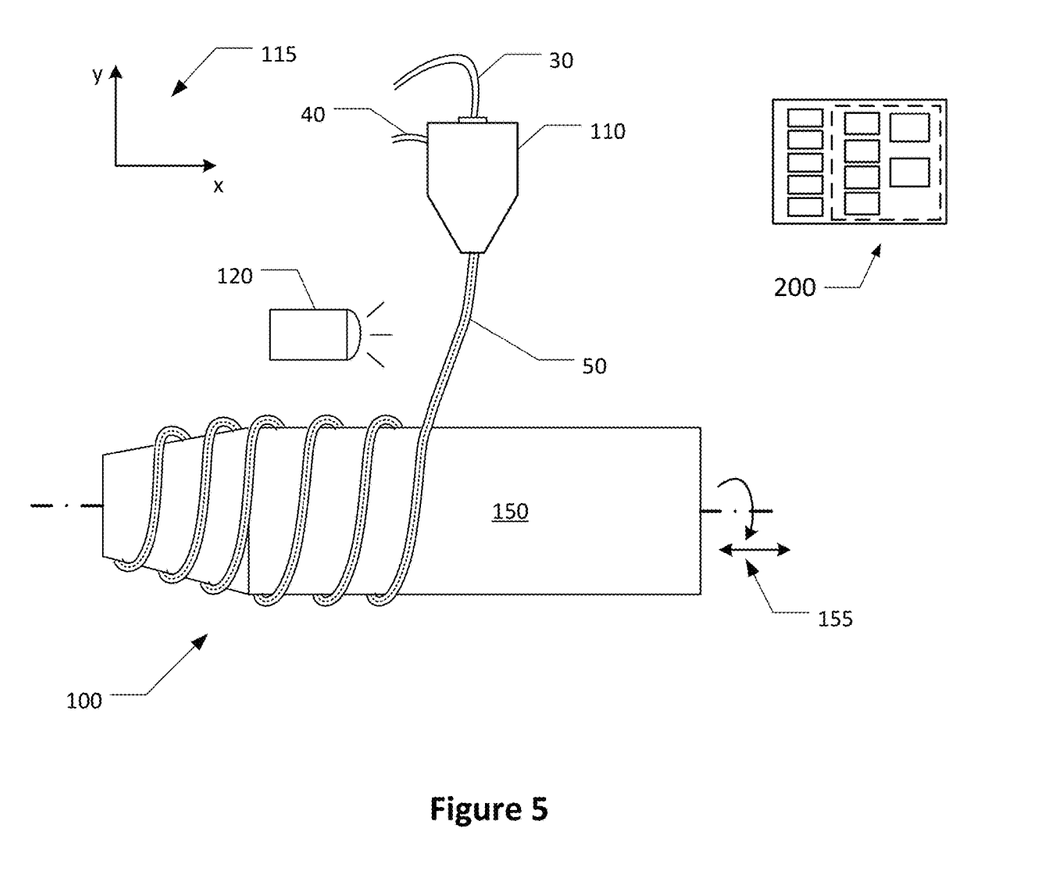
FIG. 5 shows another embodiment of a machine system for forming extruded shapes.

FIG. 5 shows an alternate embodiment of a machine system 100 for receiving extrusion 50 for forming shapes. In this embodiment, a mandrel 150 may receive extrusion 50. The mandrel 150 is controlled by mandrel axis 155, which provides rotation about a central axis, and may also provide axial translation. The mandrel may be cylindrical, conical, or may include an offset axis for forming complex rotation-based shapes. Shown in FIG. 5 is a conical shape that transitions to a cylindrical shape. The mandrel may include holes or protrusions to anchor the leading end of the extrusion 50 prior to rotating. Coordination of the mandrel axis 155 with the nozzle axis 115 is performed by the control system 200. A curing system 120 may be used to cure extrusion 50. The mandrel 150 may be at least partially transparent or translucent and fitted with UV lights to reduce shadow areas for uniform UV curing.

Figure 6:
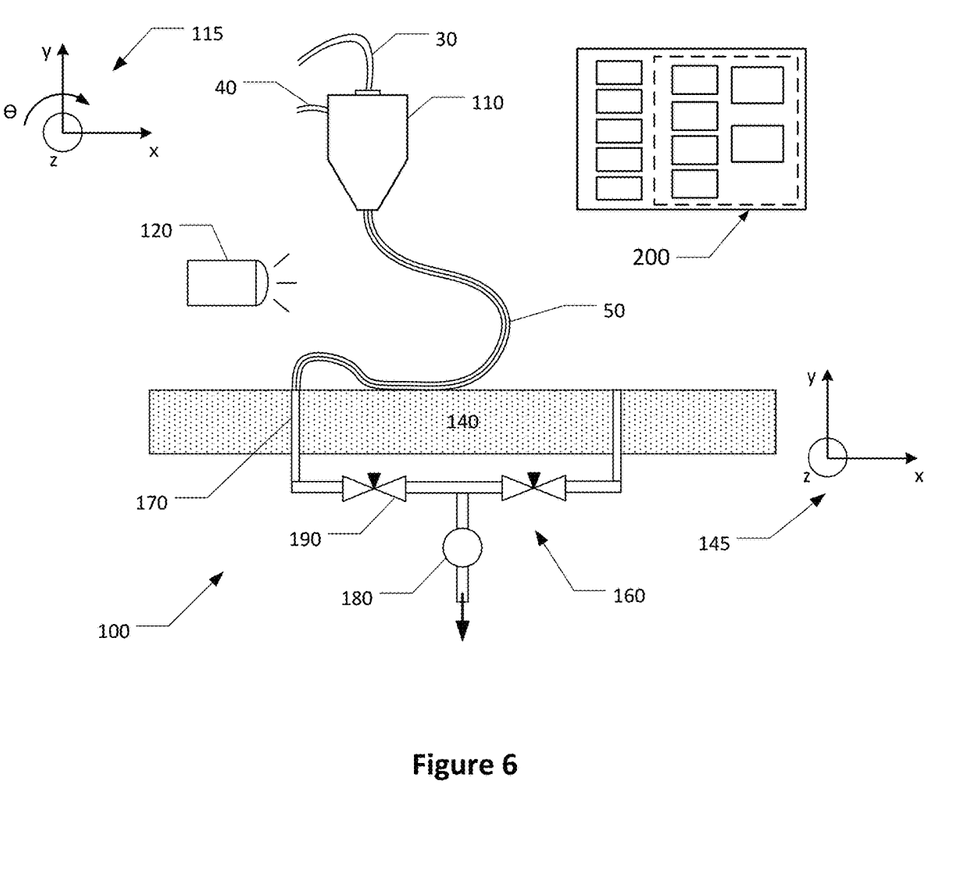
FIG. 6 shows yet another embodiment of a machine system for forming extruded shapes.

For certain core fluids or certain shapes, the core fluid 25 used in the production of a concentric extrusion 50 requires removal. In some scenarios, the final shape may be cured, trimmed if needed, and any core fluid 25 may be removed using manual methods. In other scenarios, however, auto-removal of the core fluid 25 may be preferred. FIG. 6 shows another alternate embodiment of a machine system 100 for receiving extrusion 50 for forming shapes. In this embodiment, material bed 140 includes a fluid removal system 160. Fluid removal system 160 is comprised of at least one fluid port 170 that is exposed to the top surface (as shown) of the material bed 140. A pressure system 180 enables positive or negative pressure to be applied. If more than one fluid port 170 is included, valves 190 enable pressure (positive or negative) to be applied only to the fluid port 170 that is in fluidic communication with the extrusion 50. By closing valves that are in fluid communication with any open fluid ports 170, pressure can be more efficiently directed to the extrusion 50. For some extrusions 50 that are extremely flexible, it may be preferred to at least partially cure the extrusion 50 prior to removing the core fluid 25 to avoid inflating (if positive pressure is used) or collapsing (if negative pressure is used) the extrusion 50.

In operation, the leading end of the extrusion 50 is placed in fluid communication with a fluid port 170 prior to shape formation. Curing or partial curing may occur during extrusion. Once the extrusion 50 is completed and has been severed from the hydrodynamic nozzle assembly 110, pressure may be applied using the pressure system 130. It is preferred that the severed end of the extrusion 50 be at least partially opened during application of pressure.

Figure 7:
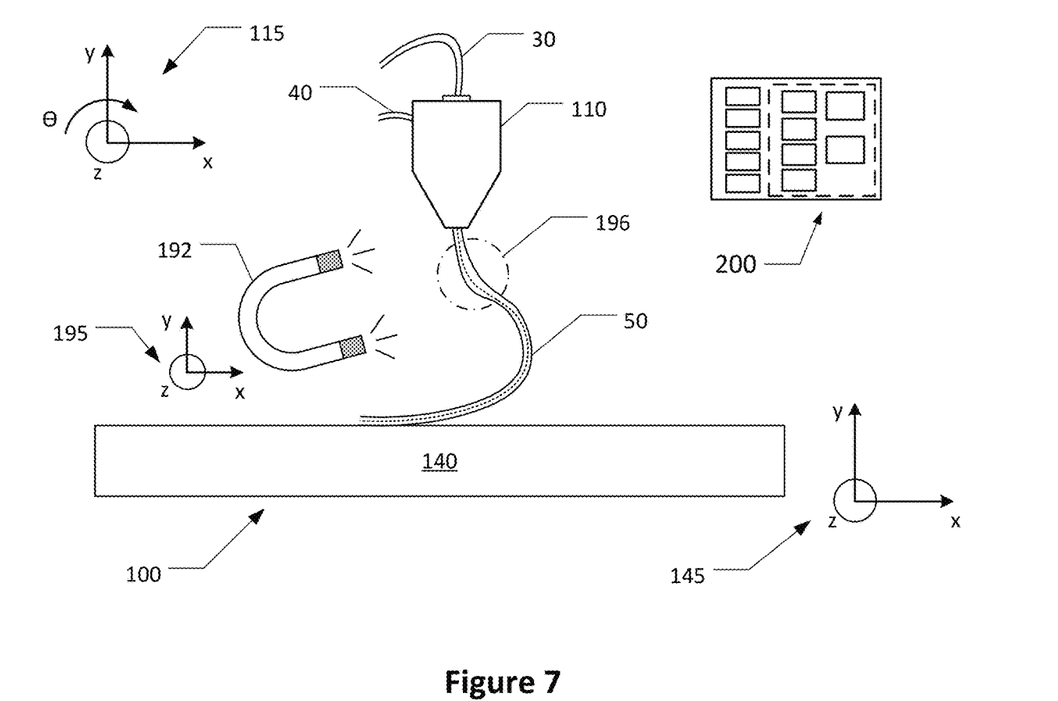
FIG. 7 shows a ferro system that may be utilized by any of the embodiments shown.

In FIG. 7 there is shown an additional feature that may improve the functionality of any of the preceding embodiments. A ferro system 192 is shown in simplified form, which may be used in cooperation with a magnetorheological or other responsive fluid such as an electrorheological fluid hereinafter "smart fluid" as the core fluid 25. The ferro system 192 may be a permanent magnet or electro-magnet that is capable of shaping the extrusion 50 by changing its position or cross-section acting on the ferrofluid as the core fluid 25. The ferro system 192 is controlled by ferro axis 195, which may provide rotation and translation of the ferro system 192. By using a smart fluid, the apparent viscosity can be changed by the application of a magnetic or electric field, creating a flow change and therefore shape change in the core fluid. Combining and diverging the core streams allow for a wide range of shape adjustments to the extruded shape.

The control system 200 shown in FIG. 8 will now be discussed. The control system 200 is supplied power by a power supply 280. The control system 200 may include a communication interface or module 220 coupled to a shape processing module 230. The shape processing module 230 may be communicatively coupled to an extrusion module 240, a positioning module, 250, a curing module 260, a pressure module 270, and a ferro module 275.

The shape source 210 may be any type of device capable of transmitting data related to a shape file to be formed by machine system 100 in cooperation with the shape processing module 230. The shape source 210 may include a general-purpose computing device, e.g., a desktop computing device, a laptop computing device, a mobile computing device, a personal digital assistant, a cellular phone, etc. or it may be a removable storage device, e.g., a flash memory data storage device, designed to store data such as shape data. If, for example, the shape source 210 is a removable storage device, e.g., a universal serial bus (USB) storage device, the communication interface 220 may include a port, e.g., a USB port, to engage and communicatively receive the storage device. In another embodiment, the communication interface 220 may include a wireless transceiver to allow for the wireless communication of shape data 215 between the shape source 210 and the control system 200. Alternatively, the communication interface 220 may facilitate creation of an infrared (IR) communication link, a radio-frequency (RF) communication link or any other known or contemplated communication system, method or medium.

The communication interface 220 may be configured to communicate with the shape source 210 through one or more wired and/or wireless networks. The networks may include, for example, a personal area network (PAN), a local area network (LAN), a wireless local area network (WLAN), a wide area network (WAN), etc. The networks may be established in accordance with any number of standards and/or specifications such as, for example, IEEE 802.11x (where x indicates a, b, g and n, etc.), 802.16, 802.15.4, Bluetooth, Global System for Mobile Communications (GSM), code-division multiple access (CDMA), Ethernet, etc.

The shape processing module 230 may receive the shape data 215 from the communication interface 220 and process the received shape data 215 to create a shape job 225 for use within the machine system 100. Alternatively, the processing of the shape data 215 may be performed by the shape source 210 or other device or module and the resulting shape job 225 may be communicated to the communication interface 220. The processed shape data 215 and/or shape job 225 may, in turn, be provided to the shape processing module 230. The shape processing module 230 can cache or store the processed shape data 215 or may communicate the shape data 215 in real-time for shape job 225 creation.

The shape processing module 230 sends the shape job 225 to the extrusion module 240, positioning module 250, curing module 260, and optionally the pressure module 270 if using a pressure system 180 with the material bed 140, and optionally the ferro module 275 if ferrofluid is used as the core fluid 25. The extrusion module 240 controls the extrusion parameters based on material properties of the sheath fluid 15 and core fluid 25, and desired shape outcome. The extrusion module 240 is configured to cooperate with positioning module 250, which includes positioning data for the nozzle axis 115 and material bed axis 145. Alternately, if the mandrel 150 is used instead of the material bed 140, the positioning module 250 includes positioning data for the nozzle axis 115 and mandrel axis 155. Position sensors 290 provide feedback for closed-loop location information. Sample position sensors 290 include optical encoders (not shown) that may be linear or rotary strips having scale markings that are detected by optical sensors. An analog or digital signal may provide position feedback based on the number of scale markings detected by the optical sensors. Pressure module 270 receives information from the shape processing module 230 whether core fluid 25 will be removed by pressure or not. If core fluid 25 is to be removed, the magnitude and direction of pressure (such as low vacuum pressure or moderate positive pressure) will be determined based on the anticipated properties of the extrusion 50 at the time pressure is to be applied. The pressure module 270 will also control any valves 190 if multiple fluid ports are available for use. If there is only one fluid port, there is no need for valves 190.

The present disclosure will be more readily appreciated with reference to the example which follows.

Example 1

Figure 8:
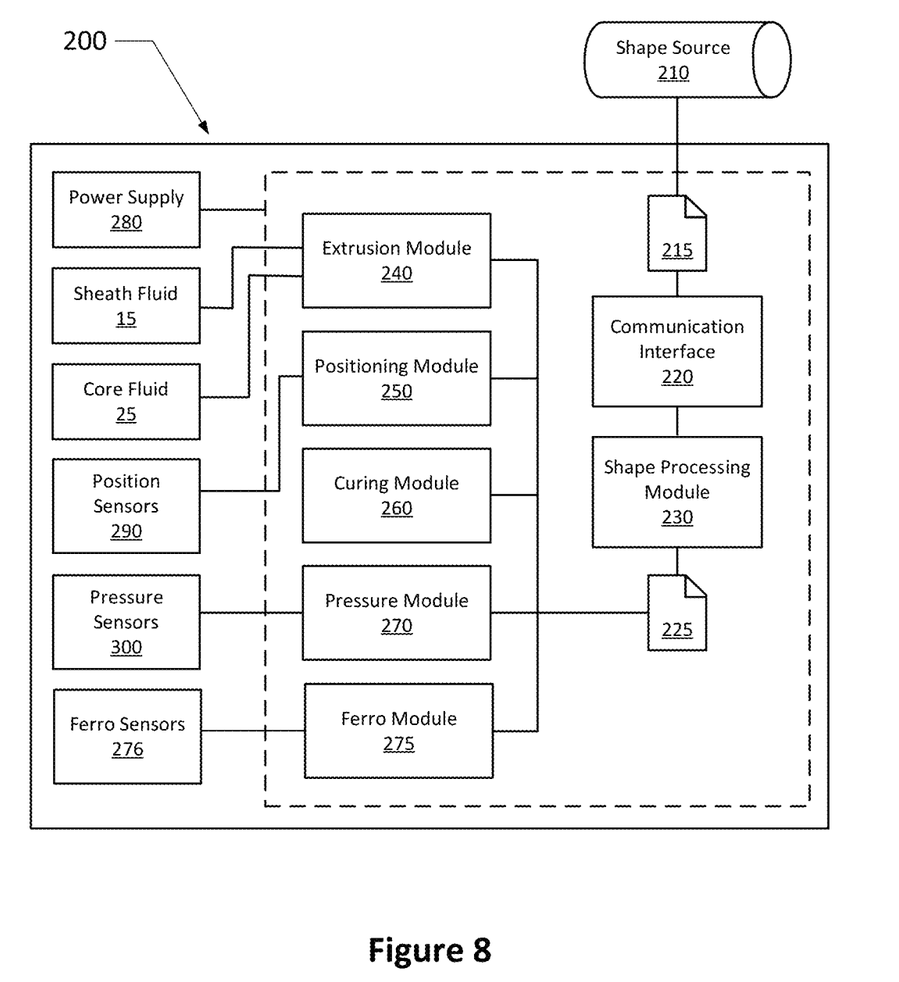
FIG. 8 shows a control system used for controlling the machine system.
Figure 9:
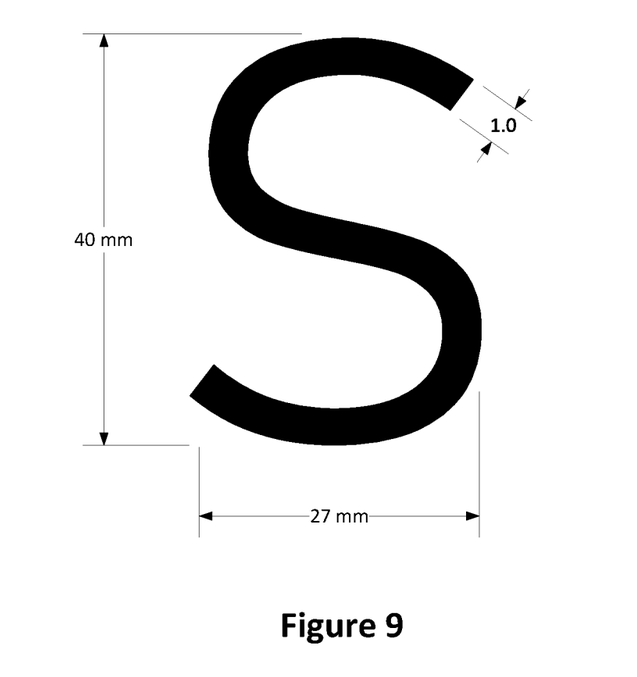
FIG. 9 shows a sample shape that is referenced in and example.

An extruded shape in the form of an "S" is desired which is shown in FIG. 8. The "S" is 40 mm in height, and 27 mm in width. The thickness (outer diameter of the extrusion) is 1 mm (1,000 microns). The sheath fluid 15 used is a polyacrylate. The core fluid is water. The inner diameter of the sheath fluid is 0.5 mm (500 microns). The shape will be trimmed manually after curing. Since water is used as a core fluid, and the inner diameter of the shape is sufficiently large so that capillary retention of the core fluid should be minimal, the automated pressure module 270 will not be requested.

The sheath fluid 15 is capable of being partially cured using typical curing wavelengths.

The curing system 120 is a 35-watt UV LED light ring attached to the hydrodynamic nozzle assembly 110. The material bed 140 includes a top surface of transparent glass. Below the material bed 140 is a 35-watt UV LED array.

The extruded shape was drawn and converted to a vector file, which is the shape data 215. The shape data 215 was received by the communication interface 220 and sent to the shape processing module 230 for processing into a shape job 225. The shape job 225 was sent to the extrusion module 240, the positioning module 250, and the curing module 260.

The machine system 100 was then activated, the hydrodynamic nozzle assembly 110 was preheated to 100° F. (37.8° C.), and sheath fluid 15 and core fluid 25 were introduced to the hydrodynamic nozzle assembly 110 via first conduit 30 and second conduit 40, respectively. The hydrodynamic nozzle assembly 110 moved to a close proximity (within 25 mm) to the material bed 140, which is planar. Extrusion from the hydrodynamic nozzle assembly 110 was activated, and the nozzle axis 115 and material bed axis cooperated to produce relative motion between the hydrodynamic nozzle assembly 110 and the material bed 140 that resulted in an "S" shape being extruded onto the material bed 140. After extrusion, the hydrodynamic nozzle assembly 110 was moved to a central position above the shape, and the curing system 120 was activated. Both the UV LED light ring and the UV LED array were activated simultaneously for 12 seconds (10 seconds minimum and a safety margin of 2 seconds). After 12 seconds, the curing system 120 was deactivated, and the hydrodynamic nozzle assembly 110 and the material bed 140 were returned to a home position, enabling the user to manually remove the shape for trimming and removal of the core fluid 25.

Example 2

Figure 10:
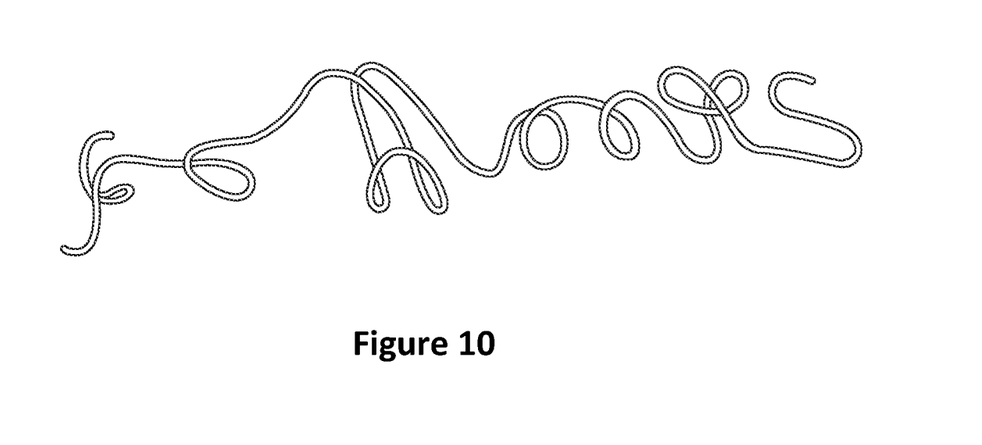
FIG. 10 shows a photograph of a three-dimensional shape created according to certain aspects of this disclosure.

The sheath fluid 15 used was a polyacrylate. The core fluid was water The inner diameter of the sheath fluid was 0.03 mm (30 microns). A random three-dimensional shape was created according to aspects of the present disclosure. See FIG. 10.

Example 3

Figure 11A:
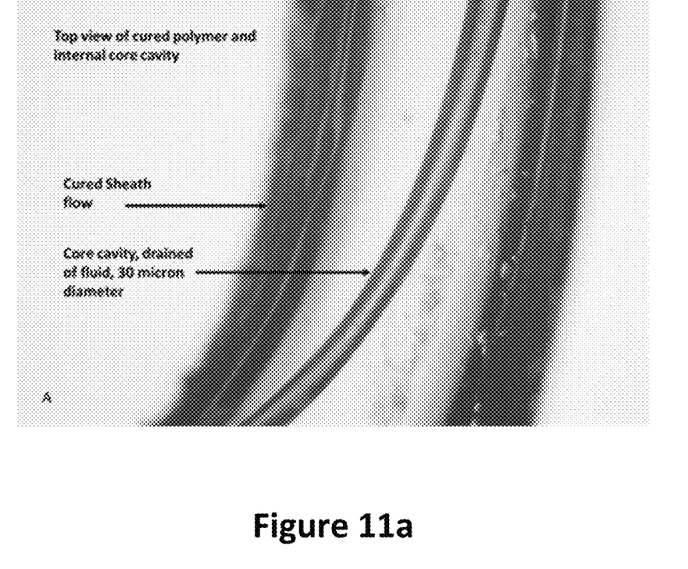
FIGS. 11a and 11b show close-up photographs of features created according to certain aspects of this disclosure.
Figure 11B:
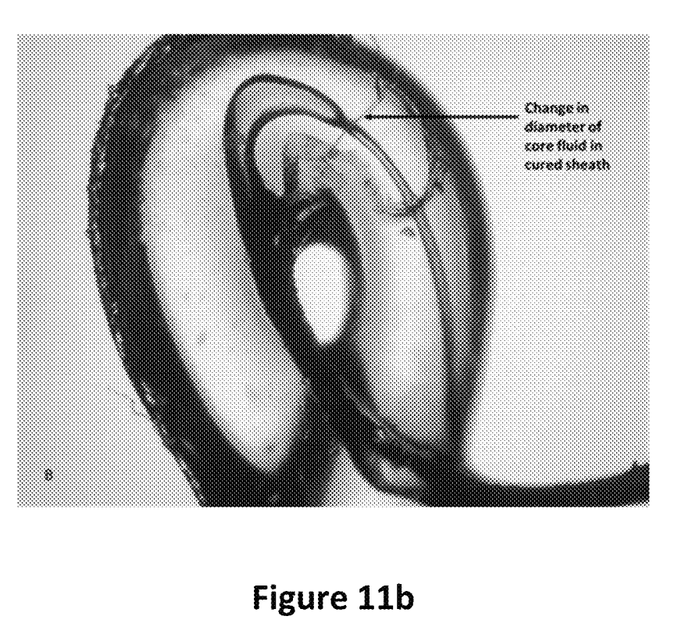

The sheath fluid 15 used was a dipentaerythritol pentaacrylate. The core fluid was an electrorheological fluid EMG 700 from Ferrotec USA Corporation, located in Santa Clara, Calif. The inner diameter of the sheath fluid was 0.03 mm (30 microns). A random three-dimensional shape was created according to aspects of the present disclosure. See FIGS. 11a and 11b.

It is contemplated and will be clear to those skilled in the art that modifications and/or changes may be made to the embodiments of the disclosure. Accordingly, the foregoing description and the accompanying drawings are intended to be illustrative of the example embodiments only and not limiting thereto, in which the true spirit and scope of the present disclosure is determined by reference to the appended claims.

What is claimed is:

1. A method for forming an extruded shape, comprising:
   a. providing a hydrodynamic nozzle;
   b. providing a curing system;
   c. providing a material bed;
   d. providing a control system;
   e. optionally providing a pressure system;
   f. optionally providing a fluid drain system;
   g. simultaneously introducing a curable sheath fluid and a smart core fluid from said hydrodynamic nozzle to form a concentric extrusion comprising an external sheath fluid and an internal smart core fluid;
   h. depositing at least a portion of said concentric extrusion on said material bed;
   i. causing relative motion between said hydrodynamic nozzle and said material bed forming an extruded shape;
   j. at least partially curing a portion of said external curable fluid;
   k. optionally introducing said concentric extrusion to pressure from said pressure system to remove said internal smart core fluid from said external curable fluid;
   l. optionally receiving said smart core fluid into said fluid drain system.

2. The method of claim 1, including the step of at least partially curing a portion of the external sheath fluid before or after depositing at least a portion of said concentric extrusion on said material bed.

3. The method of claim 1, wherein said curing system is an ultraviolet (UV) curing system.

4. The method of claim 1, wherein said pressure system provides a positive pressure or a negative pressure.

5. The method of claim 1, including the step of simultaneously moving said material bed.

6. The method of claim 1, including the step of simultaneously linear moving of said material bed in x-, y-, z-, or theta direction.

7. The method of claim 1, wherein said sheath fluid comprises a polyacrylate.

8. The method of claim 1, wherein said smart core fluid consists of an electrorheological fluid, a magnetorheological fluid, and combinations thereof.

9. The method of claim 1, including the step of providing a ferro system capable of changing the position or cross-section of a shape by application of a magnetic or electric field changing the viscosity creating a flow change and changing the shape of said smart core fluid.

10. The method of claim 9, including the step of at least partially curing said extrusion prior to removing said smart core fluid to avoid inflating (if positive pressure is used) or collapsing (if negative pressure is used) said extrusion.

11. The method of claim 1, wherein said material bed comprises a metal, a polymeric material, a transparent material, a translucent material, a glass material, a silicon wafer, and combinations thereof.

12. The method of claim 1, wherein said material bed includes means for attaching special fixtures thereto.

13. The method of claim 1, including the step of providing a control system for controlling relative movement between said hydrodynamic nozzle and said material bed.

14. The method of claim 13, said control system is supplied power by a power supply and include a communication interface or module coupled to a shape processing module communicatively coupled to said extrusion module, a positioning module, a curing module, a pressure module, and a ferro module.

15. The method of claim 1, wherein said curing system is an ultraviolet curing system.

16. A method for forming an extruded shape, comprising:
a) providing a hydrodynamic nozzle capable of forming an extrusion comprising an external curable fluid and an internal smart core fluid;
b) providing a curing system;
c. providing a material bed;
d.) providing a fluid drain system comprising at least one fluid drain;
e) providing a control system;
f) providing relative motion from the control system so that the hydrodynamic nozzle is positioned proximate to a fluid drain in the material bed;
g) forming an extrusion from the hydrodynamic nozzle so that the external curable fluid is in communication with the material bed, and the internal smart core fluid is in communication with the fluid drain; and
h) providing relative motion from the control system while simultaneously forming an extrusion from the hydrodynamic nozzle to form a shape having at least a hollow portion.

\* \* \* \* \*